United States Patent
Dennis, III et al.

(10) Patent No.: US 7,971,541 B2
(45) Date of Patent: Jul. 5, 2011

(54) SUBMERGED SUBSTRATE PLUG CUTTER AND RELATED METHOD

(75) Inventors: Raymond Franklin Dennis, III, Lithia, FL (US); Gary Joe Montin, Palmetto, FL (US); Michael Adam Granville Burton, Palmetto, FL (US); Gary Ray Andersen, Palmetto, FL (US)

(73) Assignee: WilsonMiller, Inc., Naples, FL (US)

( * ) Notice: Subject to any disclaimer, the term of this patent is extended or adjusted under 35 U.S.C. 154(b) by 209 days.

(21) Appl. No.: 12/174,698

(22) Filed: Jul. 17, 2008

(65) Prior Publication Data

US 2010/0116184 A1    May 13, 2010

Related U.S. Application Data

(60) Provisional application No. 60/950,169, filed on Jul. 17, 2007.

(51) Int. Cl.
*A01C 5/02*    (2006.01)
*A01C 11/00*   (2006.01)
*A01G 23/02*   (2006.01)

(52) U.S. Cl. .......... 111/101; 111/106; 111/115; 111/95; 111/900; 111/919

(58) Field of Classification Search .......... 111/101–107, 111/114, 115, 89, 92–99, 900, 915, 918, 111/919
See application file for complete search history.

(56) References Cited

U.S. PATENT DOCUMENTS

| 7,191,489 B1* | 3/2007 | Heath | 15/320 |
| 2008/0135579 A1* | 6/2008 | Bertram et al. | 222/145.5 |

* cited by examiner

*Primary Examiner* — Christopher J. Novosad
(74) *Attorney, Agent, or Firm* — Lewis, Longman & Walker, P.A.; Roy David Jackson, Jr.

(57) ABSTRACT

A device for use in cutting plugs of submerged substrate and particularly seagrass plugs for the purpose of transplanting using a corresponding transport receptacle and method. The device utilizes a hollow cutting member with a serrated bottom edge capable of being placed over a targeted area and forced into the submerged substrate, created vacuum pressure in the hollow cutting member, and compressed air injected between the exterior of the hollow cutting member and the submerged substrate to accomplish cutting of a submerged substrate unit. Vacuum pressure in the hollow cutting member is released to transfer the collected unit to the corresponding transport receptacle with a removable bottom. A corresponding method for transplanting a collected seagrass plug is further accomplished by creating a hole at recipient site using the device and removing the transport receptacle's removable bottom to release the plug into the created hole.

7 Claims, 9 Drawing Sheets

SUBMERGED SUBSTRATE PLUG CUTTER AND RELATED METHOD

CROSS-REFERENCE TO RELATED APPLICATIONS

This application is related to provisional patent application Ser. No. 60/950,169 filed Jul. 17, 2007, and claims the benefit of this earlier filing date.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to devices and methods used for cutting plugs of submerged substrate and, more particularly, a device and corresponding method used for cutting plugs of submerged aquatic vegetation (seagrass), a corresponding receptacle for transporting the cut plug, and a related method for transplanting a submerged aquatic vegetation plug.

2. Description of Related Art

The present invention provides an improved method and device for collecting, transporting, and transplanting plugs of submerged aquatic vegetation, in particular seagrass. More specifically, the present invention relates to a method and device for more easily and effectively collecting, transporting, and transplanting plugs of submerged aquatic vegetation. Further, the method and device can be utilized to more easily and effectively collect and transport a submerged substrate core sample. Further, the invention also provides for a transport receptacle to be utilized in conjunction with the device.

Submerged aquatic vegetation, seagrass in particular, is an essential part of the overall aquatic environment. Many species of marine animals rely on seagrasses for several functions including as a food source and as an area for cover and breeding. Whether it is for the purpose of restoring impacted seagrass beds or establishing new areas of seagrasses, the transplantation of seagrasses presents many physical and practical challenges to those who engage in this important activity.

Although different techniques of hand planting seagrasses have been historically employed by others, such as the peat pot method, staple method, and plug method (*A Guide to Planting Seagrasses in the Gulf of Mexico*, Fonseca), establishment of seagrass habitat using these methods has historically been problematic, particularly when transplanting relatively large areas of seagrass. In addition to varying degrees of success with these planting methods, these methods have also proven to be inefficient and physically demanding for those implementing them. More specifically, the peat pot method uses a typical 3-inch by 3-inch sod plugger to cut plugs of seagrass for transplanting. While relatively efficient, this method removes a limited amount of associated sediment with the cut seagrass plug, which makes it susceptible to failure when transplanted in recipient areas with high wave energy and/or current velocities. The staple method addresses some of the concerns about high wave energy/current velocity, but the method involves the time-consuming step of attaching the seagrass plants to staples before they are transplanted. Further, this method may result in the undesirable side effect of leaving potentially sharp pieces of partially-oxidized metal staples in the bottom of the recipient area. (Fonseca, p. 11). The plug method uses core tubes to remove plugs of seagrass with the associated sediment from donor beds and is generally recognized for achieving good results. (Fonseca, p. 9). In executing this method, a tube (typically 4 to 6-inch diameter PVC) is manually twisted into the substrate to the desired depth using a metal bar inserted through the top of the tube. The tube is then sealed with a plywood or PVC cap with a rubber stopper to create a vacuum to allow the plug to be removed from the submerged substrate with additional twisting and pulling of the metal bar inserted through the top of the tube. The plug is then planted directly from the core tube into a newly created hole at the recipient site by removing the rubber stopper allowing the plug to slide out of the tube.

Considering the inadequate results of these other methods to transplant seagrass plants and, in particular, relatively large areas of seagrasses in a reliable and economic fashion, the inventors devised the subject invention to improve the process and ultimately the success of transplanting seagrasses. More specifically, improvements upon the effective, but very time-consuming and physically demanding plug method as described above were addressed through this invention. The subject method and the related apparatus were developed after evaluating the various potential physical conditions of donor and recipient sites and implementing a procedure that recognized the growth habits, life histories, and the physical limitations of the species to be transplanted.

Similarly, the method and related apparatus can be utilized as a coring device to provide a more effective and efficient means for collecting a submerged substrate core sample for use in various geological and environmental endeavors.

U.S. Pat. No. 3,756,323 to Mays. (1971) and U.S. Pat. No. 5,492,181 to Grant (1994) each disclose devices to be used for cutting and planting plugs of turf or sod, which while addressing the cutting of substrate do not allow for the efficient cutting of a submerged unit, including the removal of a submerged aquatic vegetation unit without damaging the unit, nor do they describe any means for transporting the removed plug outside of the device. U.S. Pat. No. 4,282,684 to McLellan (1981) discloses a plant transplanter which provides for a device with cuts into the substrate to remove a plant for transplanting, but does not make any provisions for creating vacuum pressure in the cylindrical member to allow for efficient cutting and transplanting of submerged aquatic plants. Also, U.S. Pat. No. 4,135,752 to Long (1979) discloses a ground plugging device which combines a tubular metal body with teeth on the bottom edge and a blunt edge on top for accepting foot pressure; however, it does not address preserving the cut plug for purposes of transplanting nor does it address the problem of efficiently removing a plug of submerged substrate.

U.S. Pat. No. 6,070,537 to Anderson (2000) discloses a process and apparatus for planting shoots of nursery-incubated aquatic plants, but does not provide for the effective cutting and subsequent transplanting of existing viable seagrass plugs from a donor bed to a recipient site. In addition, U.S. Pat. No. 6,684,536 to Anderson (2004) discloses a planter for a slab of seagrass and related process, which provides a means for cutting a large quantity of seagrass for the purpose of transplanting; however, cutting of seagrasses in a slab, as opposed to smaller more manageable plugs as provided for in the subject invention, is often not a viable option based on the conditions at the donor bed or recipient site.

BRIEF SUMMARY OF THE INVENTION

The present invention includes a manually operated plug cutter, a transport receptacle to be used in conjunction with the cutting device, and a related method for collecting and transporting plugs of submerged aquatic vegetation or submerged substrate core samples and further transplanting the collected submerged aquatic vegetation (typically, plugs of seagrass) along with the associated sediment. The method integrates the sequential collection, transport, and planting of submerged aquatic vegetation plug or the collection and transport of a submerged substrate core sample. During the collection process the plug cutter utilizes a hollow cutting member with a sharpened serrated bottom edge. Further, a ball-valve assembly, constructed of non-corrosive material, along with a rubber gasket and cap set on top of the hollow cutting member are utilized to create vacuum pressure inside the hollow cutting member, which is necessary to remove the submerged aquatic vegetation plug or submerged substrate core sample from the submerged substrate. A handle attached to the hollow cutting member is used to drive the hollow cutting member into the submerged substrate and, eventually, to help lift the plug cutter out of the submerged substrate. Optionally, an attached plate surrounding the hollow cutting member serves as a handle, a foot operated means of inserting the plug cutter into the submerged substrate, and a depth guide for the collection of the submerged aquatic vegetation plugs or submerged substrate core sample. The plug cutter also uses compressed air to release the vacuum pressure between the hollow cutting member and the submerged substrate. The collected unit is then transferred to the corresponding transport receptacle by placing the plug cutter on top of the transport receptacle and opening the ball-valve to release the vacuum pressure inside the hollow cutting member allowing the collected plug to slide into the transport receptacle. Following the transfer of a submerged aquatic vegetation plug to a recipient site, the plug cutter is utilized to create a hole in which the collected submerged aquatic vegetation plug is installed flush with the adjacent substrate by holding the transport receptacle over the hole and removing the transport receptacle's removable bottom to allow the collected plug to be installed into the hole.

DETAILED DESCRIPTION OF THE INVENTION

Plug Cutter

Figure 1:
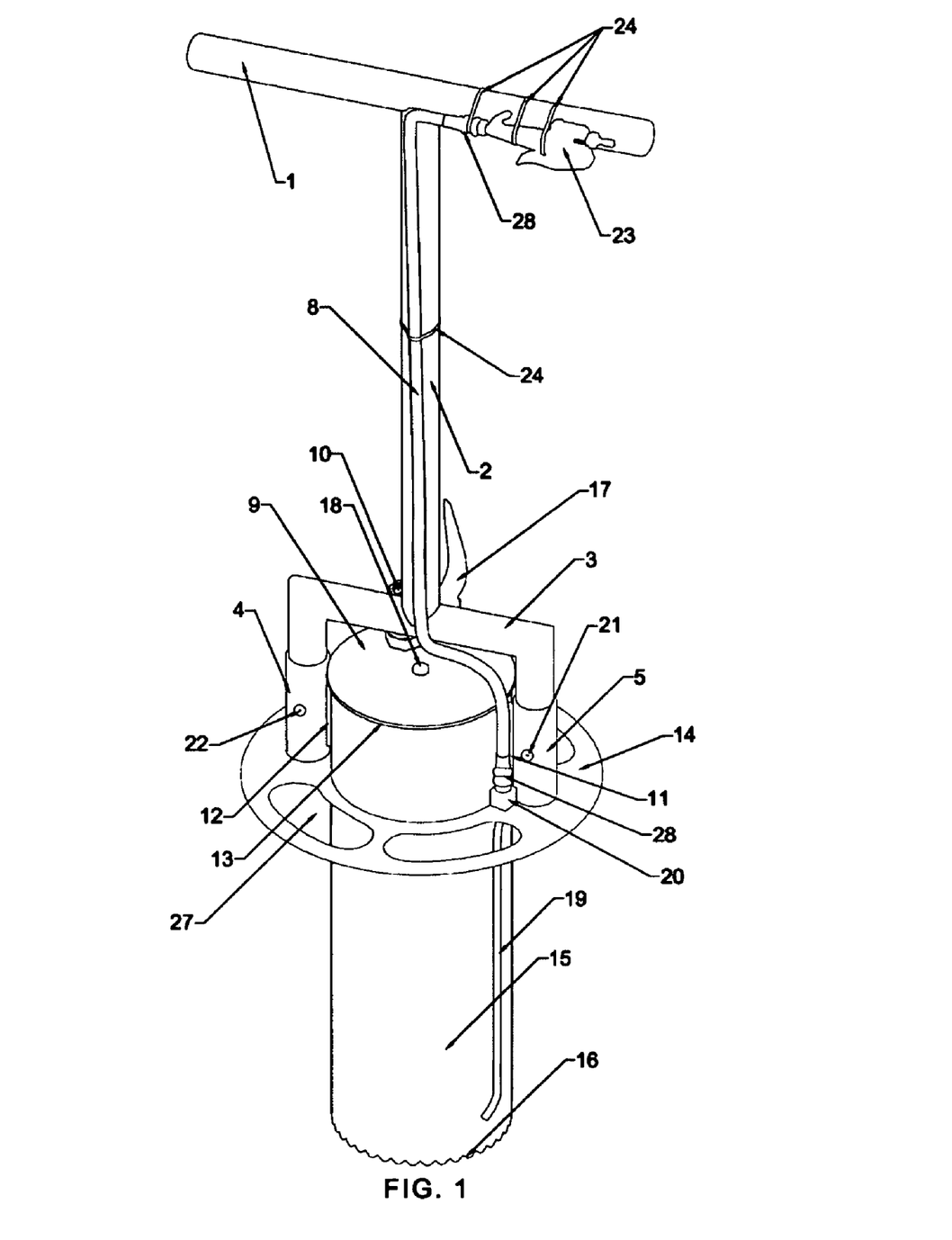
FIG. 1 is a perspective view of the front of the plug cutter in the preferred embodiment revealing the compressed air line and attached components.
Figure 2:
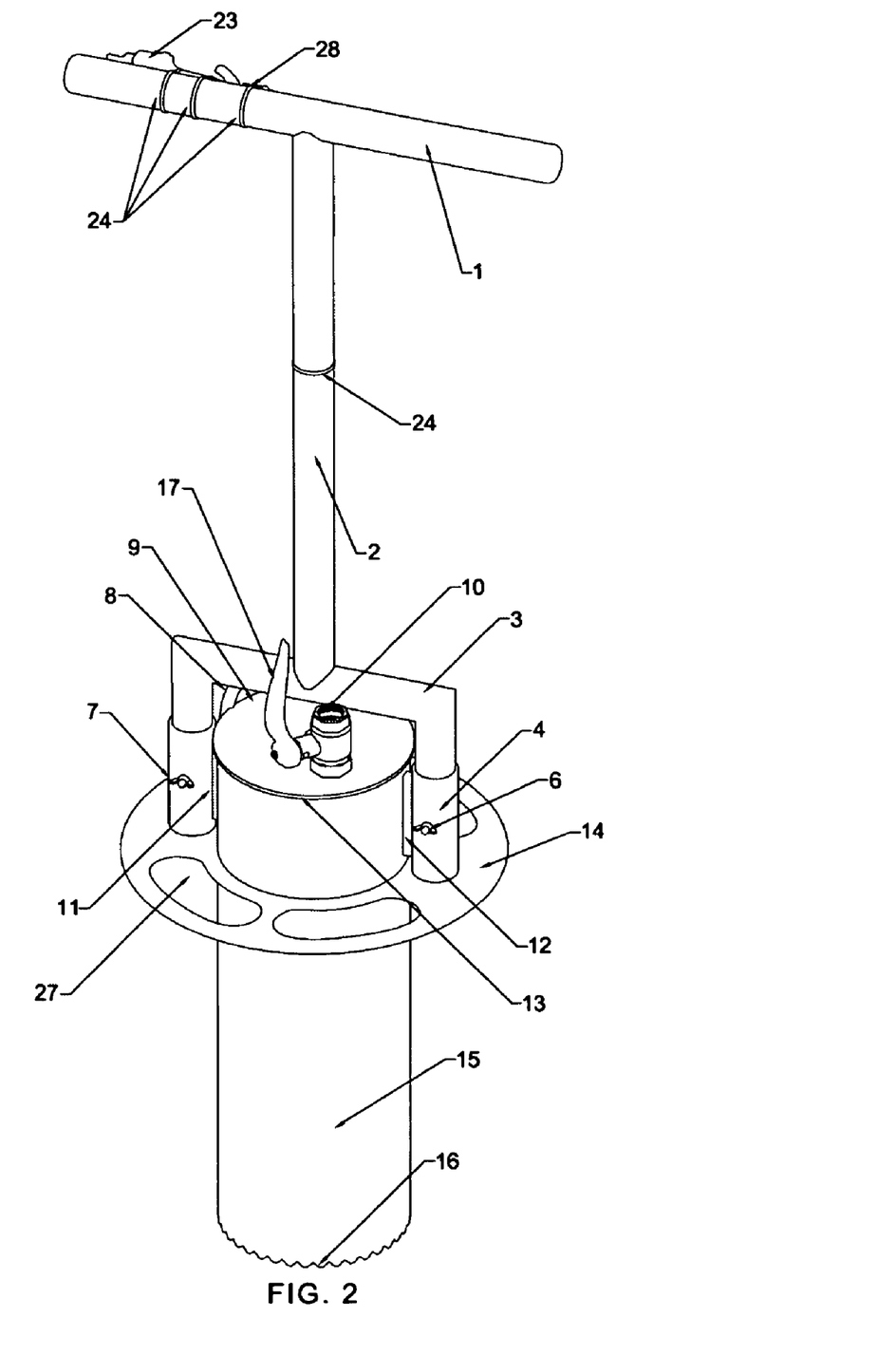
FIG. 2 is a perspective view of the back of the plug cutter in the preferred embodiment revealing the mounted ball-valve assembly.

Referring now to the drawings, wherein like reference characters designate like or corresponding parts throughout the several views, there is shown in FIGS. 1 and 2 the preferred embodiment of the plug cutter. Unless otherwise noted, the components of the plug cutter are to be constructed of a durable, light-weight, and non-corrosive material such as stainless steel.

The hollow cutting member 15 is open at both ends and has sharpened serrated cutting teeth 16 along the bottom edge to allow for easier penetration of the submerged substrate. In addition, this design will allow for the clean shearing of the targeted plant (including the plant's root system or rhizomes) to assist with the preservation of the targeted plant and surrounding substrate during transportation and transplant. In the preferred embodiment, the hollow cutting member 15 is cylindrical and designed with an approximate length of 35.6 cm (14 inches) and an approximate outside diameter of 15.2 cm (six inches) as these dimensions represent an appropriate "standard" for the transplantation of a wide range of submerged aquatic vegetation and allow for the effective and efficient use of the plug cutter under normal conditions. The length and diameter of the hollow cutting member 15 can vary depending on the specific application, core sample size requirements, and other variables dictated by the area and/or the species of submerged aquatic vegetation targeted for transplant. Accordingly, the dimensions, as well as the relative positions, for the other components of the plug cutter may be reasonably modified from what is shown in the preferred embodiment in order to adapt to the required dimensions of the hollow cutting member 15 as dictated by the targeted application.

Figure 4:
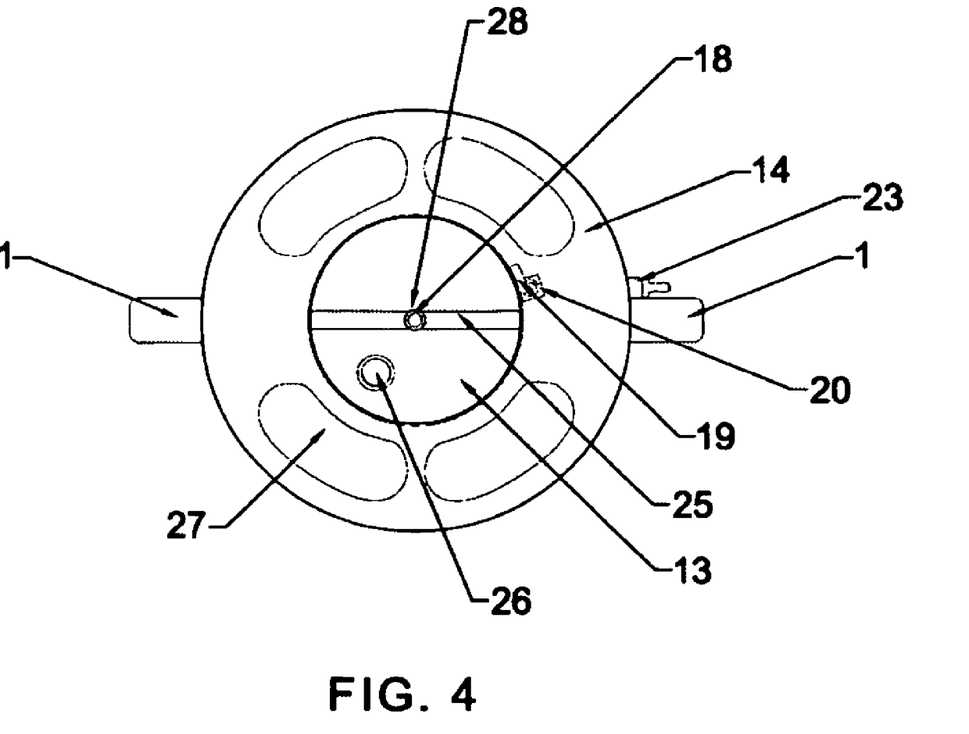
FIG. 4 is a bottom view of the plug cutter in the preferred embodiment.
Figure 5:
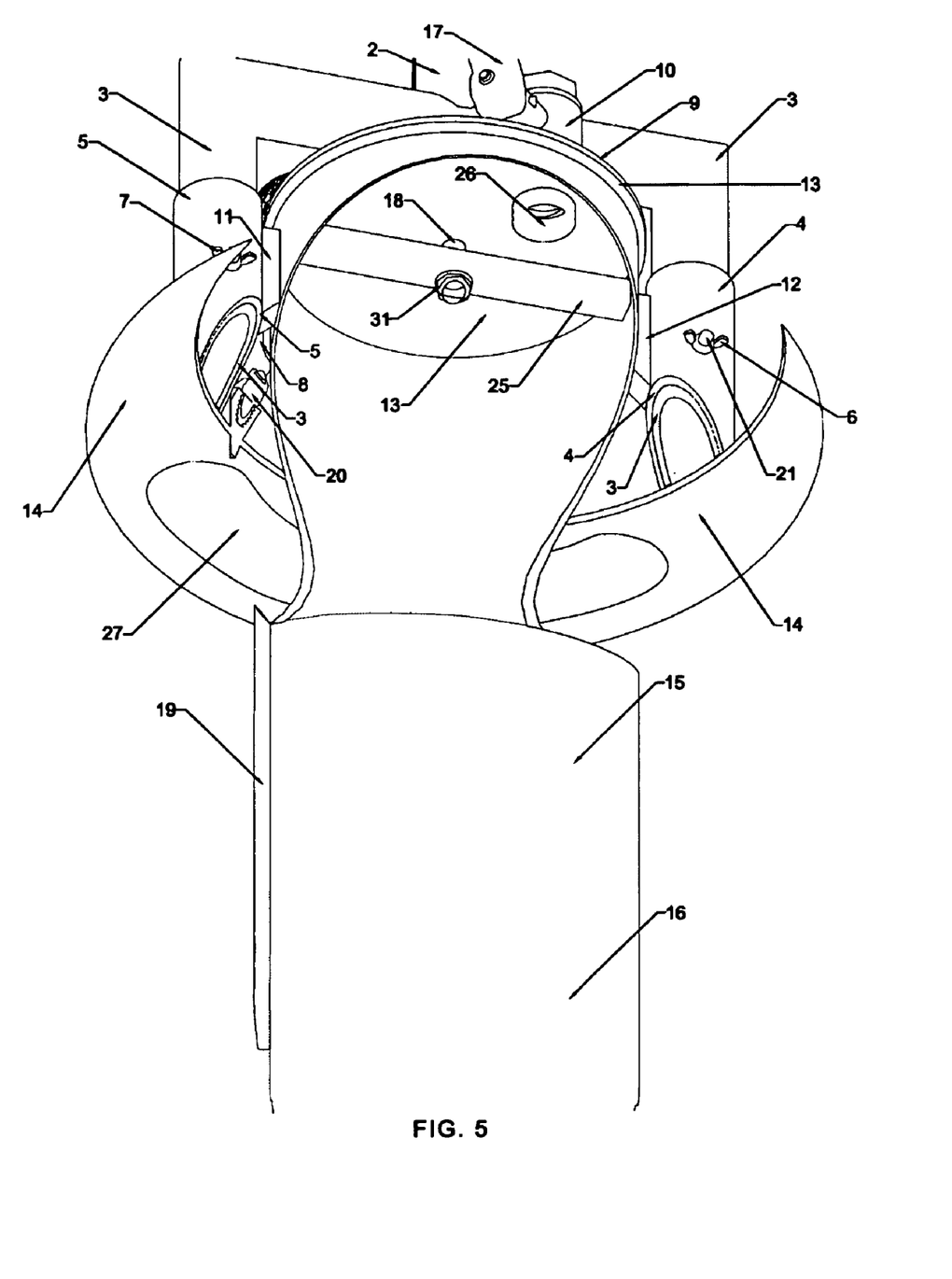
FIG. 5 is an enlarged perspective cut-away view of the interior of the plug cutter in the preferred embodiment revealing the concealed components for securing the cap, gasket, and ball-valve assembly.
Figure 6:
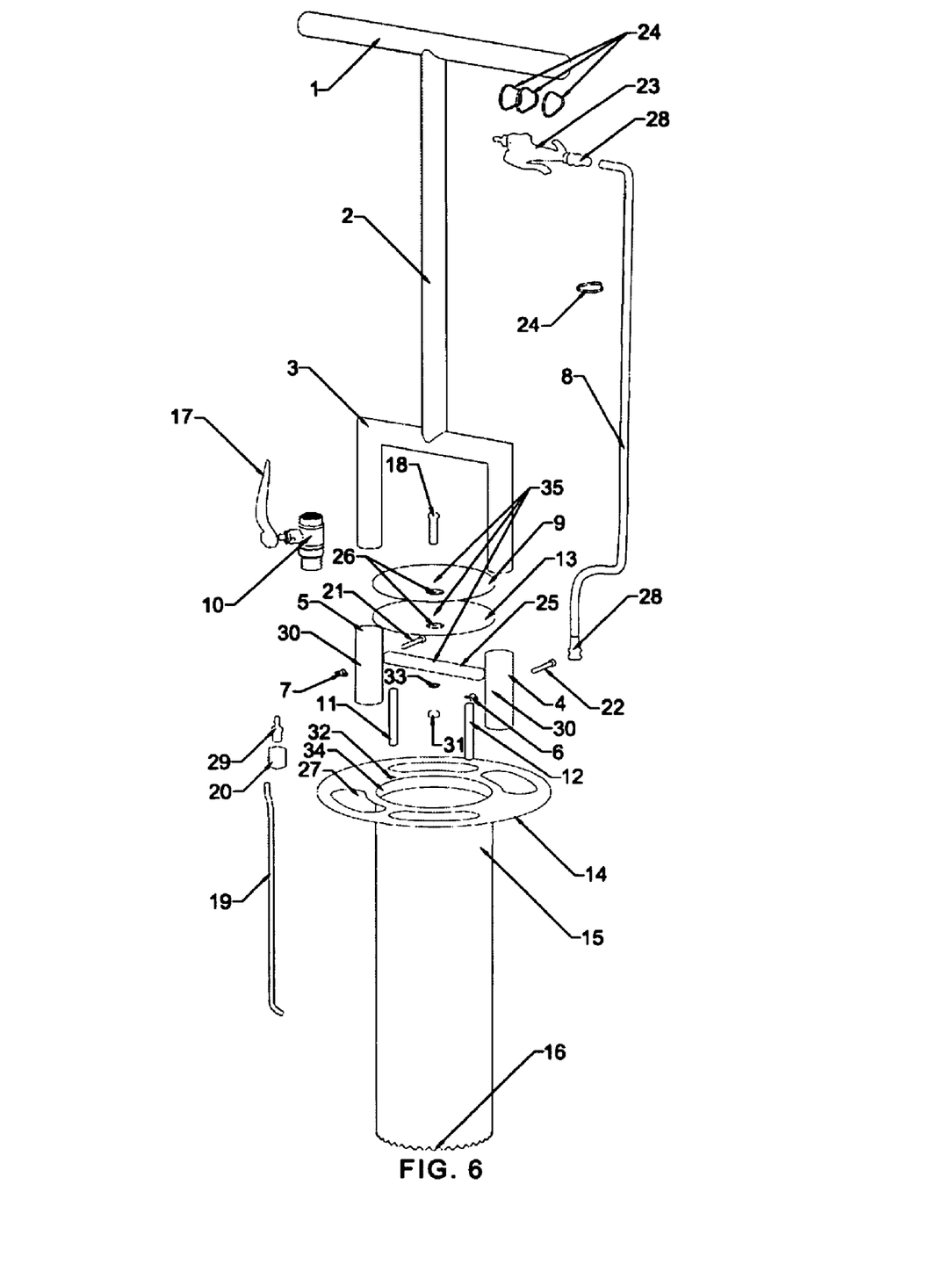
FIG. 6 is an exploded perspective view of the plug cutter in the preferred embodiment displaying the individual components.

In order to efficiently and effectively cut plugs of submerged substrate, vacuum pressure must be created within the hollow cutting member 15 by sealing the top opening of the hollow cutting member 15. In the preferred embodiment, the top opening of the hollow cutting member 15 is sealed with a gum rubber gasket 13 of a slightly larger diameter than the outside diameter of the hollow cutting member 15 to create a small overhanging lip to ensure a water-tight seal. The gasket 13 is overlaid by a circular cap 9 with approximately the same diameter as the gasket 13. As shown in FIGS. 4, 5, and 6, both the cap 9 and gasket 13 are centered atop the hollow cutting member 15 and secured to a mounting bracket 25 by means of a lock washer/nut assembly 31, 33. As shown in FIGS. 4 and 5, the mounting bracket 25 is permanently attached, as by welding or the like, to the opposite interior sides of the hollow cutting member 15. The gasket 13, the cap 9, and the mounting bracket 25 each have a matching hole 35 bored in their center to accept the bolt 18, as shown in FIGS.

Figure 3:
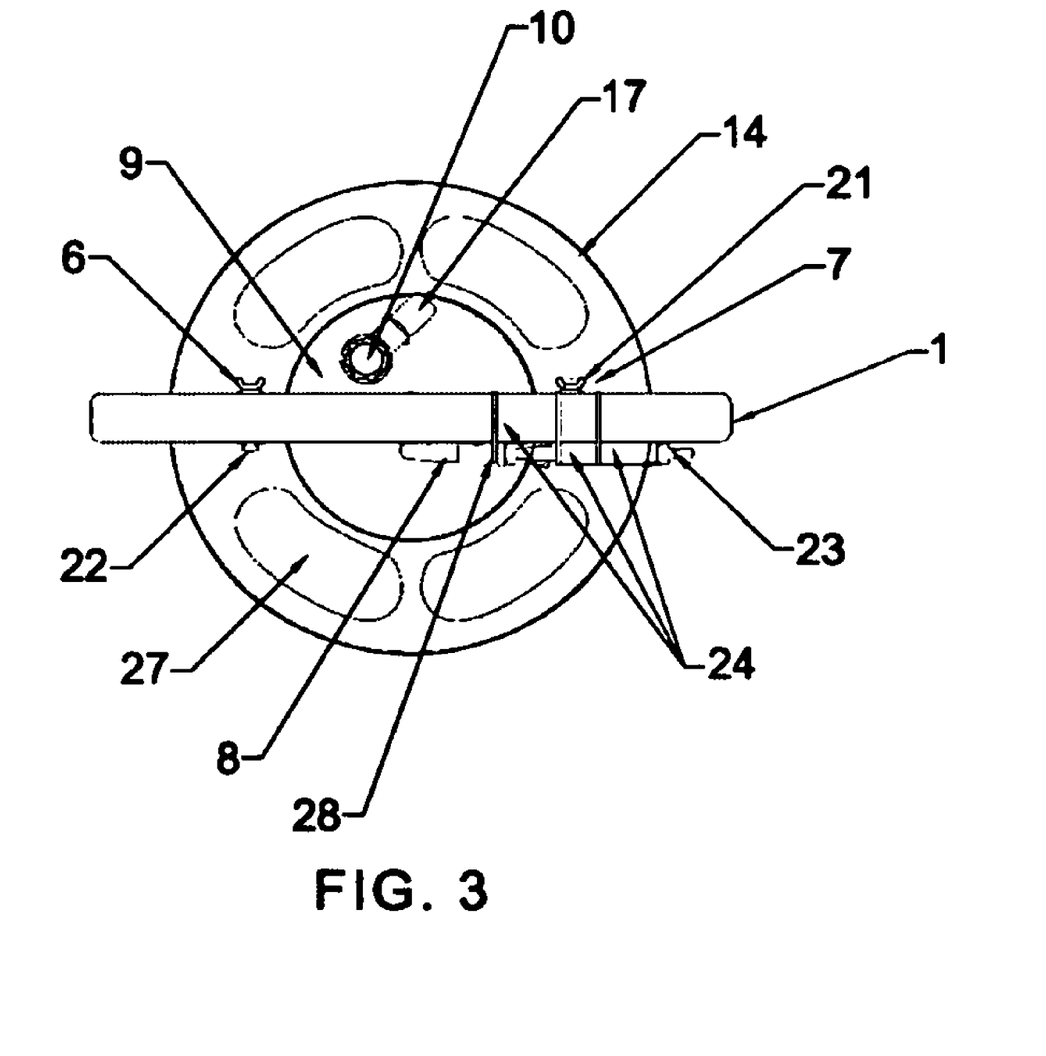
FIG. 3 is a top view of the plug cutter in the preferred embodiment.

4, 5, and 6. In the event that any material becomes jammed in the hollow cutting member 15, the gasket 13 and cap 9 can easily be removed to clear the jammed material. Also, as shown in FIGS. 3, 4 and 6, in the preferred embodiment, both the gasket 13 and the cap 9 each have an additional hole 26 bored off center to accept and secure a ball-valve assembly 10, which is made of a non-corrosive material.

In addition, two handle sleeves 4-5 are mounted, as by welding or the like, to the opposite sides of the hollow cutting member 15. In the preferred embodiment, mounting blocks 11-12 are utilized to secure the two handle sleeves 4-5 to the hollow cutting member 15. As shown in FIGS. 1, 2 and 6, the plug cutter also has a handle consisting of three handle components 1-3, which, in the preferred embodiment, are tubular with a diameter of approximately 3.2 cm (1.25 inches) and secured together, as by welding or the like. In the preferred embodiment, handle component 1 extends horizontally approximately 45.7 cm (18 inches) in length. Handle component 2 extends from the approximate midpoint of handle component 1 vertically, at a length of approximately 45.7 cm (18 inches) in the preferred embodiment, where it attaches to the approximate midpoint of the cross member of the generally U-shaped handle component 3, such that the cross member of U-shaped handle component 3 is aligned with handle component 1 and the extending legs of U-shaped handle component 3 are parallel to handle component 2 and extend away from handle component 1. The cross member of U-shaped handle component 3 is approximately 21.6 cm (8.5 inches) in length in the preferred embodiment. The two extending legs of U-shaped handle component 3 are to be of the same length, approximately 15.2 cm (six inches) in the preferred embodiment, and insert into the two corresponding handle sleeves 4-5 in order to attach the handle 1-3 to the hollow cutting member 15. In the preferred embodiment, the handle 1-3 is secured to the corresponding handle sleeves 4-5 through drill holes 30 and by means of removable bolt/wing nut assemblies 21 and 7, 22 and 6, as shown in FIGS. 1, 2, and 6, which makes the handle 1-3 removable and thus preferable for the purpose of storing and transporting the plug cutter.

Additionally, a compressed air line mounting block 20 is attached, as by welding or the like, to the exterior of the hollow cutting member 15. In the preferred embodiment, as shown in FIGS. 1 and 6, a piece of approximately 0.95 cm (3/8 of an inch) diameter hollow tubing 19 runs along the outside of the hollow cutting member 15 starting at the base of the compressed air line mounting block 20, which is fitted with a compression fitting to attach to the hollow tubing 19, and terminating slightly above the serrated teeth 16 at the bottom of the hollow cutting member 15. The hollow tubing 19 is permanently secured, as by a spot weld, bracket, or the like, to the outside of the hollow cutting member 15. In the preferred embodiment, an additional small spot weld is placed on the outside of the hollow cutting member 15 just beyond where the hollow tubing 19 terminates in order to help protect the exposed open end of the hollow tubing 19. Further, as shown in FIGS. 3 and 4, the hollow tubing 19 is connected to the air gun 23 via a section of flexible air hose 8 fitted with female couplings 28 at either end, in the preferred embodiment, for quick removal. One end of the flexible air hose 8 is attached to the back end of the air gun 23 and the other end of the flexible air hose 8 is attached to the top of the compressed air line mounting block 20 fitted with a male coupling 29, in the preferred embodiment, to attach the flexible air hose 8. Both the air gun 23 and the removable flexible air hose 8 are strapped to the handle components 1 and 2 using plastic straps 24 in the preferred embodiment.

In the preferred embodiment, as shown in FIGS. 1, 2, and 6, surrounding the hollow cutting member 15, and set approximately 5.1 cm (two inches) down from the cap 9, is a circular foot pad/depth guide plate 14. In the preferred embodiment, the plate 14 is of sufficient thickness, approximately 0.32 cm (1/8 of an inch) and extends approximately 7.6 cm (three inches) beyond the outer surface of the hollow cutting member 15 in order to provide adequate strength and width for applying downward pressure by foot. The plate 14 has a hole 34 cut in the center of sufficient diameter in order for it to fit tightly around the exterior of the hollow cutting member 15. The plate 14 is also permanently attached, as by welding or the like, to the exterior of the hollow cutting member 15. The plate 14 serves as a foot pad for applying pressure manually to insert the hollow cutting member 15 into the submerged substrate and as a stop guide to control the depth that the plug cutter is inserted into the submerged substrate. In addition, the plate 14 serves as a flat surface for attaching, as by welding or the like, handle sleeves 4-5 and provides additional support for these components. Also, the plate 14 has a small cutout 32 that lies near the edge of the center cutout 34 to accommodate the compressed air line mounting block 20, which is also attached to the plate 14 to provide additional support. Optionally, and as shown in the preferred embodiment, four identical cutouts 27 are evenly spaced along the outer rim of the plate 14, which serve to minimize the weight of the plug cutter and to function as handles when transporting the plug cutter.

Transport Receptacle

In the preferred embodiment, the transport receptacle used for transporting plugs of submerged aquatic vegetation or submerged substrate core samples includes a hollow cylindrical member 37 constructed of standard PVC tubing. There are several alternative materials that can be utilized for construction of the hollow cylindrical member of the transport receptacle 37 depending on what the application dictates. Such alternative materials may include, but are not limited to, cotton, other natural and synthetic textiles, degradable polymers, and biodegradable polymers. The hollow cylindrical member of the transport receptacle 37 should be longer than the hollow cutting member 15 and have the same interior diameter as the hollow cutting member 15 in order to help maintain the integrity of the collected submerged aquatic vegetation or submerged substrate core sample. The dimensions of the hollow cylindrical member of the transport receptacle 37 may be adjusted accordingly to complement the dimensions of the hollow cutting member 15 as necessary.

Figure 8:
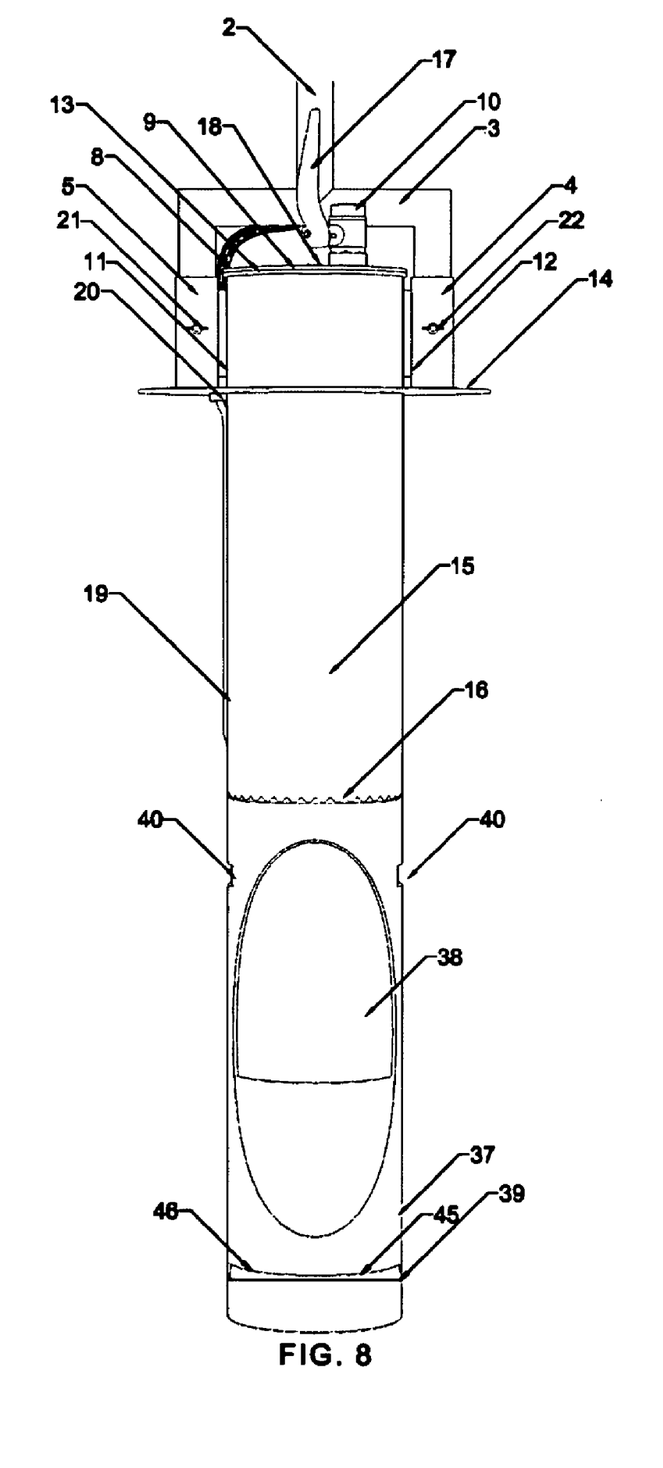
FIG. 8 is a perspective view of the lower section of the plug cutter in the preferred embodiment set atop a cut-away view of the corresponding transport receptacle.
Figure 9:
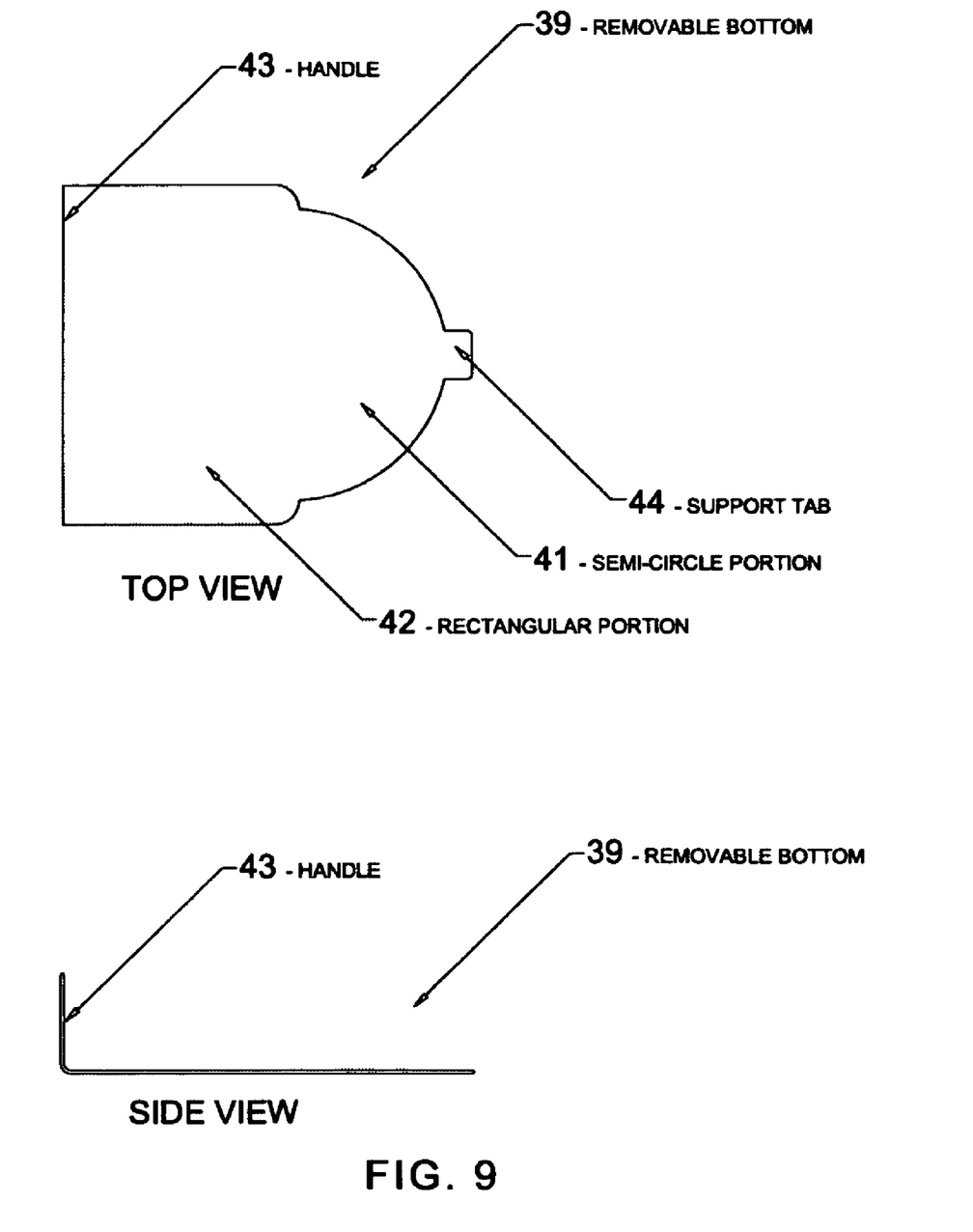
FIG. 9 includes a top view and side view of the preferred embodiment of the transport receptacle's removable bottom.

In the preferred embodiment, as shown in FIG. 8, two slits 45, 46 approximately 0.32 cm (1/8 of an inch) thick are cut approximately 2.5 cm (one inch) from the bottom of the hollow cylindrical member of the transport receptacle 37 in order to accommodate the removable bottom 39. The longer slit 45 is as long as one-half the circumference of the hollow cylindrical member of the transport receptacle 37 while the shorter slit 46 is centered directly opposite the center of the longer slit 45 and is long enough to allow the support tab 44 of the removable bottom 39 to pass through the hollow cylindrical member of the transport receptacle 37. The removable bottom 39 is constructed of a thin, durable, and non-corrosive material such as stainless steel and is shaped as shown in FIG. 9. The semi-circular portion 41 of the removable bottom 39 has the same diameter as the inside diameter of the hollow cylindrical member of the transport receptacle 37.

In the preferred embodiment, a rectangular portion 42 with a length exceeding the diameter of the semi-circular portion 41 is centered on the semi-circular portion 41 and extends to a width approximately 2.5 cm (one inch) beyond the radius of the semi-circular portion 41. In addition, in the preferred embodiment and as shown in FIG. 9, approximately the outer 1.3 cm (0.5 inch) of the width of rectangular portion 42 is bent at an angle in order to form a grip 43 for the removable bottom 39. Directly opposite of rectangular portion 42 is support tab 44, which is approximately 2.5 cm (one inch) in width and extends approximately 2.5 cm (one inch) from the outside edge of the semi-circular portion 41 of the removable bottom 39. When properly placed in the hollow cylindrical member of the transport receptacle 37, the support tab 44 of the removable bottom 39 protrudes out of the shorter slit 46 of the hollow cylindrical member of the transport receptacle 37 and the rectangular portion 42 of the removable bottom 39 protrudes from the longer slit 45 of the hollow cylindrical member of the transport receptacle 37.

Optionally, as shown in the preferred embodiment, two openings 40, approximately 10.2 cm (four inches) in width and 2.5 cm (one inch) in height, are cut through both sides of the hollow cylindrical member of the transport receptacle 37 approximately 2.5 cm (one inch) from the top of the hollow cylindrical member of the transport receptacle 37. The openings 40 serve as handles for lifting and transporting the transport receptacle and also to allow for excess water that may have been trapped in the hollow cutting member 15 to be discharged prior to transport.

Method

After selection of the targeted submerged aquatic vegetation or the area for a submerged substrate core sample is made, the serrated teeth 16 of the hollow cutting member 15 are carefully placed around the selected plant or area. The valve handle 17 of the ball-valve assembly 10 is in the vertical position and remains open while the hollow cutting member 15 is inserted into the submerged substrate to allow excess trapped water to escape from the hollow cutting member 15 during the insertion process. The hollow cutting member 15 is inserted into the submerged substrate by applying downward pressure by hand through the handle 1-3 or by foot on the plate 14. Once the hollow cutting member 15 is inserted to the desired depth, the ball-valve assembly 10 is closed by moving the valve handle 17 into the horizontal position. Closing the ball-valve assembly 10 creates the necessary vacuum pressure within the hollow cutting member 15 to prevent the premature release of the submerged substrate plug 38 from the hollow cutting member 15 while the plug cutter is removed from the surrounding submerged substrate.

Figure 7:
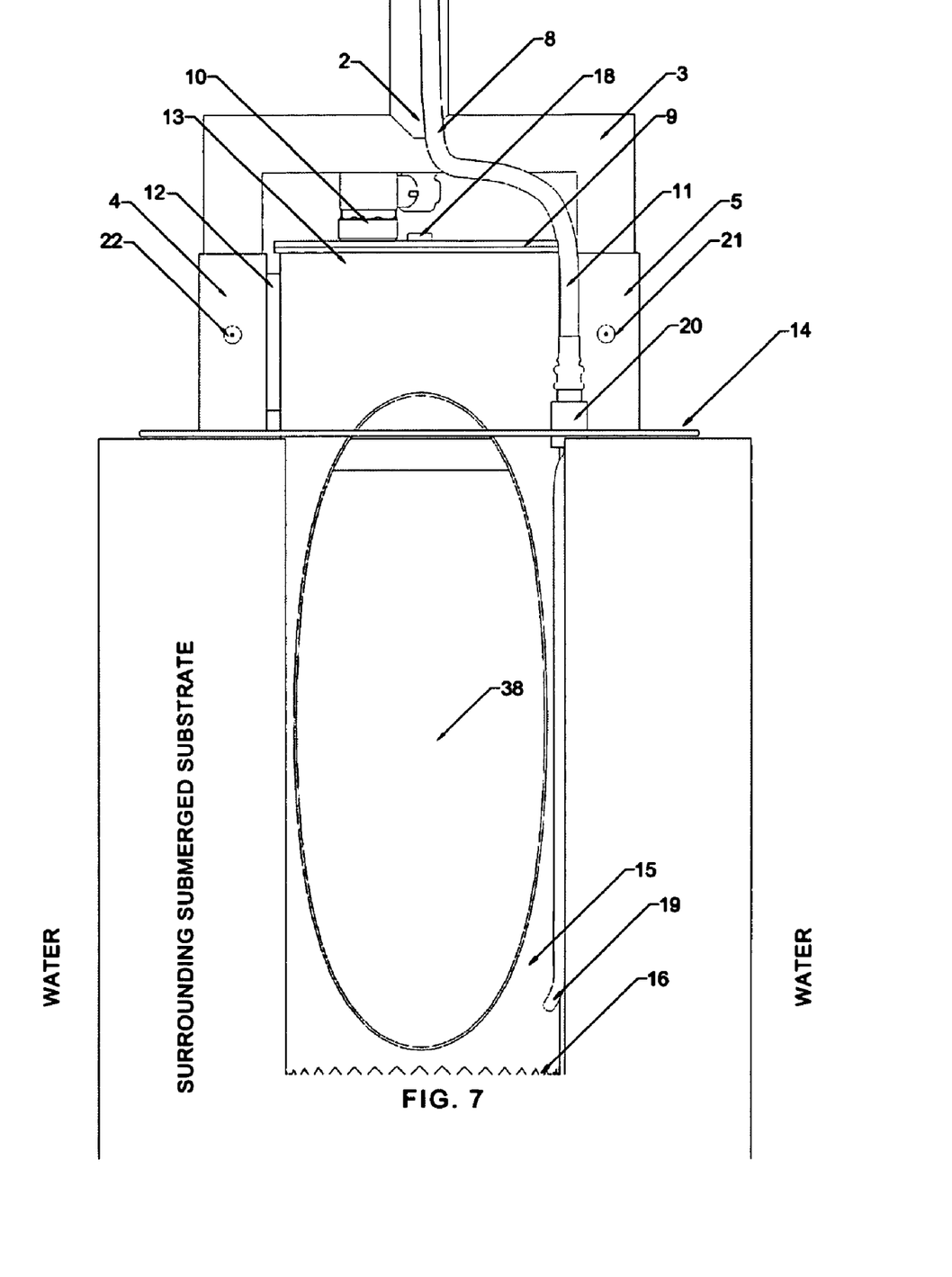
FIG. 7 is an enlarged perspective cut-away view of the immersed plug cutter in the preferred embodiment revealing a submerged aquatic vegetation plug/submerged substrate core sample within the hollow cutting member ready to be removed from the surrounding submerged substrate by the application of compressed air.

When the hollow cutting member 15 is fully inserted into the submerged substrate, significant vacuum pressure is created between the exterior of the hollow cutting member 15 and the surrounding submerged substrate making the extraction of the subject invention (now further weighted with the submerged substrate plug 38) extremely difficult. The invention overcomes this problem with the release of compressed air between the outside of the hollow cutting member 15 and the surrounding submerged substrate. See FIG. 7. The air gun 23 is attached to a source of compressed air, between 80 and 120 psi in the preferred embodiment. The operator injects the compressed air in between the exterior of the hollow cutting member 15 and the surrounding submerged substrate by squeezing the air gun 23 trigger. The air is then expelled at the base of the hollow cutting member 15 through the hollow tubing 19 allowing the operator to easily lift the plug cutter by the handle 1-3 out of the surrounding submerged substrate with the submerged substrate plug 38 intact.

The plug cutter along with the submerged substrate plug 38 is then moved to an appropriate location in order to transfer the submerged substrate plug 38 into the hollow cylindrical member of the transport receptacle 37. The hollow cylindrical member of the transport receptacle 37 may optionally be placed in a stand for additional support during the transfer process. Prior to transfer, the removable bottom 39 is properly inserted into the hollow cylindrical member of the transport receptacle 37 with the support tab 44 protruding out of the shorter slit 46 of the hollow cylindrical member of the transport receptacle 37 and the rectangular portion 42 of the removable bottom 39 protruding out of the longer slit 45 of the hollow cylindrical member of the transport receptacle 37. Transfer of the submerged substrate plug 38 is accomplished by setting the plug cutter on top of the hollow cylindrical member of the transport receptacle 37 with the open bottom of the hollow cutting member 15 facing the open top end of the hollow cylindrical member of the transport receptacle 37 as shown in FIG. 8. Opening the ball-valve assembly 10 by moving the valve handle 17 to the vertical position releases the vacuum pressure within the hollow cutting member 15 resulting in the ejection of the intact submerged substrate plug 38 into the hollow cylindrical member of the transport receptacle 37. See FIG. 8. Depending on the number of plugs of submerged aquatic vegetation to be transplanted from a particular donor bed, multiple transport receptacles could be utilized to transport multiple plugs of submerged aquatic vegetation to a recipient site for transplanting simultaneously.

The transport receptacle with a submerged substrate core sample may then be transported to the desired location to be analyzed or preserved for analysis as necessary. Alternatively, in the method whereby a plug of submerged aquatic vegetation has been collected and transported for transplanting, the transport receptacle with the plug of submerged aquatic vegetation and associated sediment is transported to the desired location at the recipient site for transplanting within an appropriate amount of time of collection dependent upon the species of submerged aquatic vegetation being transplanted. Utilizing the plug cutter and the previously described steps, a hole of appropriate depth is created in the submerged substrate at the desired location for transplant. The transport receptacle with the submerged aquatic vegetation and associated sediment is positioned upright and directly into the newly created hole such that the rectangular portion 42 of the removable bottom 39 is resting on the substrate adjacent to the newly created hole. The submerged aquatic vegetation and associated sediment are then released into the newly created hole by pulling outwardly on the grip 43 of the removable bottom 39, removing it from the hollow cylindrical member of the transport receptacle 37. Finally, as necessary, the newly transplanted submerged aquatic vegetation unit may be gently manipulated by hand to assure that it has been planted flush with respect to the adjacent substrate.

It should be understood that the foregoing disclosure relates primarily to the preferred embodiment of the invention and that numerous modifications or alterations may be made therein without departing from the spirit and scope of the invention as set forth in the appended claims.

The invention claimed is:

1. An apparatus for cutting and collecting plugs of submerged substrate, which comprises:
   (a) a hollow cutting member made of a durable non-corrosive material having open top and bottom ends;
   (b) the bottom end of the hollow cutting member having sharpened serrated teeth to allow insertion of the hollow cutting member into the submerged substrate;
   (c) a seal for the top end of the hollow cutting member to create vacuum pressure inside the hollow cutting member;

(d) a compressed air line mounting block with bottom and top ends, which is affixed to the exterior of the hollow cutting member;
(e) a compression fitting attached to the bottom end of the mounting block;
(f) a coupling attached to the top end of the mounting block;
(g) a piece of tubing made of a durable non-corrosive material attached at one end to the compression fitting and attached by its exterior to the exterior of the hollow cutting member with its other end terminating above the bottom end of the hollow cutting member;
(h) two handle sleeves attached to the exterior of the hollow cutting member;
(i) a handle attached to the two handle sleeves, allowing for pressure to be applied by hand to insert the hollow cutting member into the submerged substrate;
(j) an air gun; and
(k) a section of air hose fitted with couplings at both ends such that one end will attach to the back end of the air gun and the other end will attach to the coupling on the mounting block.

2. An apparatus as recited in claim 1, in which the hollow cutting member is cylindrical.

3. An apparatus as recited in claim 2, further comprising a circular plate made of a durable non-corrosive material surrounding and attached to the exterior of the hollow cutting member, allowing for foot pressure to be applied assisting with inserting the hollow cutting member into the submerged substrate.

4. An apparatus as recited in claim 2, further comprising a transport receptacle, which comprises:
a removable bottom made of a durable non-corrosive material; and
a hollow cylindrical member made of a durable non-corrosive material with open top and bottom ends and two slits cut above the bottom end to receive the removable bottom.

5. A process for transplanting a plug of submerged aquatic vegetation using the apparatus as recited in claim 4 comprising the steps of:
(a) placing the serrated teeth at the bottom of the hollow cutting member around the targeted area;
(b) opening the valve handle of the ball-valve assembly;
(c) inserting the hollow cutting member into the submerged substrate by applying downward pressure as necessary by hand through the handle;
(d) closing the valve handle of the ball-valve assembly to create vacuum pressure;
(e) attaching the air gun to a source of compressed air;
(f) removing the plug of submerged substrate by injecting compressed air between the outside of the inserted hollow cutting member and the surrounding substrate by squeezing the air gun trigger and lifting up on the handle of the plug cutter;
(g) securing the removable bottom within the slits of the hollow cylindrical member of the transport receptacle;
(h) setting the transport receptacle upright;
(i) aligning the bottom edge of the hollow cutting member on top of the open end of the hollow cylindrical member of the transport receptacle;
(j) opening the valve handle of the ball-valve assembly to release the vacuum pressure and eject the plug of submerged aquatic vegetation from the hollow cutting member into the hollow cylindrical member of the transport receptacle;
(k) transporting the transport receptacle with the plug of submerged aquatic vegetation to the desired location;
(l) creating a new hole at the desired location using the plug cutter and process as recited in steps (a) through (f) of this claim;
(m) positioning the transport receptacle with the plug of submerged aquatic vegetation upright and directly over the created hole such that the exposed portion of the removable bottom is resting on the substrate adjacent to the hole;
(n) releasing the plug of submerged aquatic vegetation and associated sediment from the hollow cylindrical member of the transport receptacle into the hole by removing the removable bottom from the hollow cylindrical member of the transport receptacle; and
(o) manipulating the newly transplanted plug of submerged aquatic vegetation by hand to assure it has been planted, flush with the adjacent substrate as necessary.

6. An apparatus as recited in claim 1, in which the seal for the top end of the hollow cutting member comprises:
(a) a mounting bracket attached to the interior of the hollow cutting member;
(b) a rubber gasket attached to the mounting bracket and set on the top end of the hollow cutting member;
(c) a cap attached to the mounting bracket and located on top of the rubber gasket;
(d) a ball-valve assembly located on top of said cap and secured through matching holes bored off-center in the cap and gasket where the holes will further allow water to flow up through and out of the hollow cutting member during insertion into the submerged substrate when ball-valve assembly is open.

7. An apparatus as recited in claim 1 where the handle is attached to the handle sleeves using bolt/wing-nut assemblies making the handle removable.

* * * * *